July 27, 1954     E. F. SCHROEDER     2,684,553
RODENT TRAP
Filed May 31, 1950     2 Sheets-Sheet 1
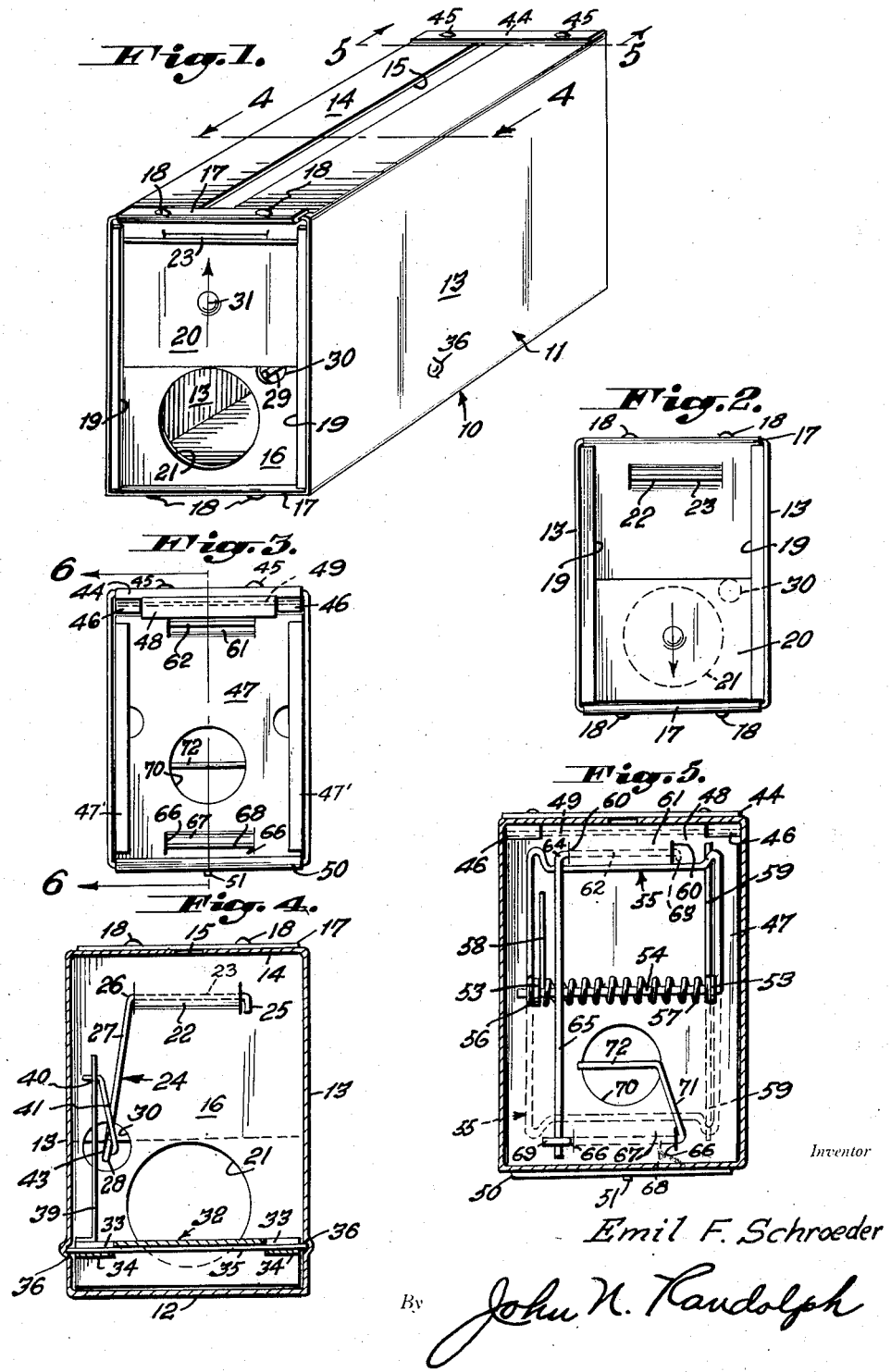
Inventor
Emil F. Schroeder
By John N. Randolph
Attorney July 27, 1954  E. F. SCHROEDER  2,684,553
RODENT TRAP
Filed May 31, 1950  2 Sheets-Sheet 2
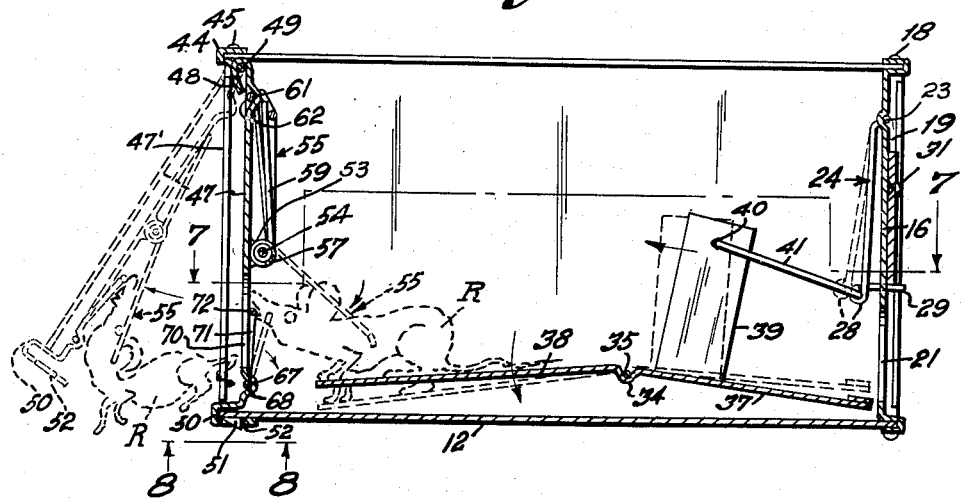
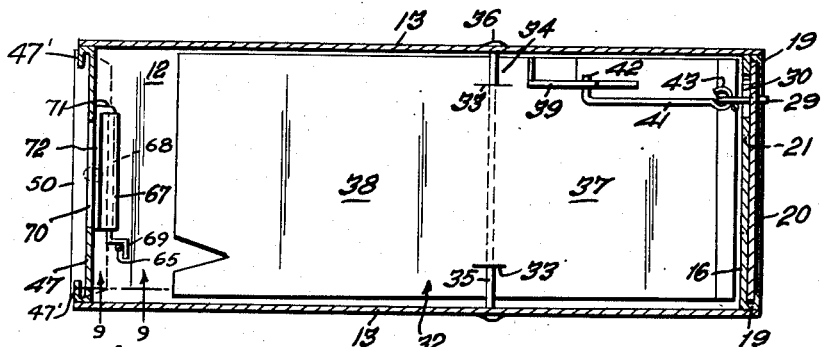
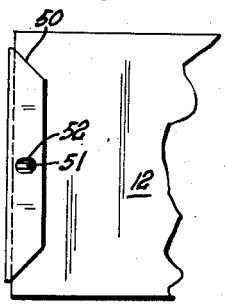
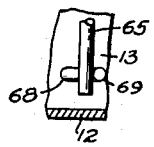
Inventor
*Emil F. Schroeder*
By *John N. Randolph*
Attorney Patented July 27, 1954

2,684,553

UNITED STATES PATENT OFFICE 2,684,553

RODENT TRAP

Emil F. Schroeder, Weyauwega, Wis.

Application May 31, 1950, Serial No. 165,229

2 Claims. (Cl. 43—81)

This invention relates to a novel construction of rodent trap primarily intended for use in initially capturing and subsequently killing rodents such as mice, rats and moles and which is so constructed that it will effectively function for accomplishing its intended result without the necessity of utilizing a bait and wherein a rodent enters the trap due to curiosity and in so doing releases a closure for entrapping the rodent therein without initially harming the rodent; said trap also being provided with a spring jaw arranged to be released by a rodent attempting to escape through an opening in the trap to thereby strike and kill the rodent.

More particularly, it is an aim of the present invention to provide a trap structure of the aforedescribed character including an exit opening across which extends one end of a wire constituting a part of the trap jaw release mechanism whereby a rodent in attempting to displace the wire away from the exit opening for an attempted escape therethrough actuates the release mechanism to release the spring jaw which then swings to a position to strike and kill the rodent.

Still a further aim of the present invention is to provide a trap of the aforedescribed character wherein the escape opening and impaling jaw constitute a part of or are carried by a hinged door or closure which closes one end of the trap housing or chamber and which may be swung to an open position for setting the spring jaw and for removing a rodent entrapped and killed thereby.

Various other objects and advantages of the invention will hereinafter become more fully apparent from the following description of the drawings, illustrating a presently preferred embodiment thereof and wherein:

Figure 1 is a perspective view looking toward the entrance end of the trap and showing said end in an open position;

Figure 2 is an end elevational view of the entrance end of the trap and showing the entrance opening in a closed position;

Figure 3 is an end elevational view looking toward the opposite end of the trap;

Figures 4 and 5 are cross sectional views of the trap taken substantially along planes as indicated by the lines 4—4 and 5—5, respectively, of Figure 1, and on enlarged scales;

Figure 6 is an enlarged longitudinal sectional view taken substantially along a plane as indicated by the line 6—6 of Figure 3;

Figure 7 is a horizontal sectional view taken substantially along a plane as indicated by the line 7—7 of Figure 6;

Figure 8 is a fragmentary bottom plan view taken substantially along a plane as indicated by the line 8—8 of Figure 6, and Figure 9 is a fragmentary sectional view taken substantially along a plane as indicated by the line 9—9 of Figure 7.

Referring more specifically to the drawings, the novel rodent trap in its entirety is designated generally 10 and includes a housing, designated generally 11, which is preferably formed of sheet metal and which is provided with a bottom 12, complementary side walls 13 and a top wall 14, which parts are preferably integrally formed. The housing 11 is relatively long and substantially rectangular in cross section and the edges of said strip of metal forming the housing terminate intermediate of the side edges of the top portion 14 to form a slot 15 therebetween which extends substantially from end-to-end of the housing 11 but which may be omitted if desired. The housing 11 is provided at one end thereof with an end wall 16 having integral top and bottom flanges 17 which are folded back upon themselves to receive complementary end portions of the bottom wall 12 and top wall 14, said top and bottom flanges 17 being secured to the bottom wall 12 and the top wall section by suitable fastenings 18. The end wall 16 has its longitudinal or vertical edges turned outwardly and back upon portions of said end wall 16 to form inwardly opening guide channels 19 for slidably receiving a plate 20 forming a closure for an entrance opening 21 which is formed in the bottom portion of the end wall 16.

The upper portion of the end wall 16 is slit at horizontally spaced points and the portion thereof disposed between the slits is pressed inwardly to form a bearing 22, as seen in Figures 2 and 4 in which is journaled a portion 23 of a strand of wire forming a latch 24 for the closure 20. Said strand of wire has one end or terminal 25 projecting from one end of the portion 23 at substantially a right angle thereto and inwardly of the end wall 16, and has another portion 26 which likewise extends inwardly of the end wall 16 and from the opposite end of the wire portion 23 and which extends in a downwardly extending portion 27 having a loop 28 at its lower end forming an eye. The other terminal or detent 29 of said strand of wire extends from the loop 28 toward the end wall 16 and normally projects outwardly through an opening 30 therein to provide a support on which a portion of the bottom edge of the closure or plate 20 rests for supporting said plate in an elevated position, as illustrated in Figure 1 and so that the entrance opening 21 will be exposed therebeneath. The plate 20 is preferably provided with a pressed out portion forming a button 31 which may be engaged by the finger or thumb for sliding the closure 20 upwardly from its closed position of Figure 2 to its open position of Figure 1.

A platform or treadle 32 is disposed within and longitudinally of the housing 11 and is provided intermediate of its ends with longitudinally extending transversely aligned slits 33. Portions of the treadle 32 disposed between the slits 33 and its side edges are bowed downwardly as seen at 34. A shaft 35 extends transversely across the treadle 32 through the slits 33 and is disposed beneath the treadle portion disposed between said slits and above the downwardly bowed portions 34. The side walls 13 are provided with transversely aligned pressed out portions forming inwardly opening bearing sockets 36 in which are journaled the ends of the shaft 35 for pivotally mounting the treadle 32, intermediate of its ends and substantially above the housing bottom 12. The treadle 32 is bent slightly adjacent the shaft 35 so that the end portions thereof are disposed at a slight angle to one another and are each normally inclined downwardly, one of said end portions 37 extends toward the end wall 16 and terminates adjacent the opening 21 and the other end portion of the treadle, designated 38, extends toward and terminates near the opposite end of the casing 11. A plate 39 forming a standard is fixed to and rises from the treadle portion 37, adjacent the shaft 35 and adjacent one side edge of the treadle 32. Said standard 39 is disposed in a plane parallel to the longitudinal axis of the trap 10 and is provided adjacent its upper end with an opening 40. A rod 41 has a terminal 42 bent at substantially a right angle to its longitudinal axis which extends through and is journaled in the opening 40 and the opposite end of said rod 41 is provided with an eye 43 which is connected to the eye or loop 28.

As seen in Figs. 3, 5 and 6, a flange 44 is secured across the outer side of the opposite end of the top wall 14 by fastenings 45 and is provided at its ends with extensions which project into said opposite end of the housing 11 and which terminate in barrel portions 46 which are disposed adjacent the top corners of the last mentioned end of the housing 11 in transverse alignment. Said last mentioned end of the housing 11 is closed by a door or closure plate 47 likewise preferably formed of a piece of sheet metal having an upper edge of reduced width relatively to the width of the rest of the door 47 and which is turned back upon itself to form a barrel portion 48 which fits between the barrel portions 46 and combines therewith to form hinged barrels which are connected by a hinge pin 49 which extends therethrough for hinging the door or closure 47 at its upper edge to the top portion of the housing 11. The door 47 has vertically extending flanges 47' at its side edges. As seen in Figure 6, the plate or closure 47 when in an upright, closed position is spaced inwardly from the last mentioned end of the housing 11 and said plate at its lower edge is bent to provide an outwardly offset, inwardly opening channel or groove 50 which extends transversely thereof and which fits around the adjacent end of the housing bottom 12. Said end of the housing bottom 12 is provided on its outer side with a stationary latch detent 51 and the outer portion or flange of the plate 47 is provided with an opening 52 in which the latch detent 51 is received for latching the closure or plate 47 in its closed position of Figure 6.

The plate 47, intermediate of its upper and lower ends, is provided with struck out apertured portions forming inwardly extending, transversely aligned bearings 53 in which is journaled a shaft 54. The shaft 54 constitutes one end of a strand of relatively heavy gauge wire the remainder of which constitutes a substantially U-shaped striking jaw 55, one leg of which extends at substantially a right angle from one end of the shaft 54 and the other leg of which terminates in an eye 56 which engages around the other terminal of the shaft 54, outwardly of the adjacent bearing 53, as best illustrated in Figure 5. A coil spring 57 is wound about the shaft 54 between the bearings 53 and has one terminal 58 thereof extending upwardly and disposed against the inner side of the plate 47. The opposite terminal 59 of the spring 57 likewise extends upwardly, when the jaw 55 is in a set position, as illustrated in Figure 5, and engages under a part of the transverse intermediate portion of said jaw 55. The plate 47 adjacent its upper end is provided with transversely aligned slits 60 and the plate portion 61 disposed therebetween is bent inwardly to form a bearing for a rod portion 62 which extends therethrough and through said slits 60, as best seen in Figures 3 and 5. The rod portion 62 has end portions 63 and 64 which project at an angle thereto inwardly with respect to the plate 47 and beyond the slits 60. The portion 64 terminates in an elongated rod end 65 which extends downwardly to adjacent the lower end of the plate 47 and which forms a jaw retaining member. The plate 47 adjacent its lower end is provided with a similar pair of transversely aligned slits 66 forming an inwardly bowed bearing portion 67 therebetween through which extends a rod portion 68, which is likewise disposed in the outer side of the plate 47 and extends inwardly through the slits 66. One terminal of the rod or heavy gauge strand of wire of which the rod portion 68 forms a part projects at substantially a right angle to one end of said rod portion 68 inwardly with respect to the plate 47 and terminates in a hook 69 which is bent away from the plate 47 as seen in Fig. 7. The plate 47 between the bearing 67 and shaft 54 is provided with an exit opening 70 of sufficient size to allow a rodent to attempt to escape therethrough. The other end of the rod portion 68 has an extension 71 which extends obliquely upwardly therefrom along the inner side of the plate 47 and which terminates in a horizontally disposed terminal portion 72 which extends across the opening 70 so as to substantially divide the opening into equal halves. The above portions 68, 69, 71, 72 comprise a trigger.

The treadle end 37 is slightly heavier than the treadle end 38 because it supports the standard 39, so that by engaging the button 31 by a finger the vertically sliding closure 20 may be moved upwardly in the guides 19 to above the openings 21 and 30. When this occurs, the treadle end 37 will swing downwardly thereby causing the standard 39 to swing toward the end wall 16. This will cause the rod 41 to move in the same direction exerting a push or thrust against the member 24 to cause it to swing in the barrel 22 toward the end wall 16, so that the terminal 29 will be projected outwardly through the opening 30 below the vertically sliding closure 20, as seen in Figures 1 and 6, and said terminal or detent 29 will then be engaged by the bottom edge of the closure 20 to support said closure in a raised or open position above the entrance opening 21 which will thus be exposed. Prior to this operation the spring-pressed jaw 55 will have been set and will be disposed in its position of Figure 5. This may be readily accomplished by pressing upwardly on the housing bottom 12 adjacent the latch detent 51 to disengage said detent from the opening 52 so that the plate 47 may be swung outwardly and upwardly on its hinge. The striking jaw 55 may then be swung against the tension of the spring 57 from its dotted line to its full line position of Figure 5, after which the jaw retaining member 65 is swung toward the plate 47. The trigger 71, 72 is swung on its shaft portion 68 toward the plate 47 to thereby swing the hook 69 upwardly and into engagement over the free end of the jaw retaining rod 65 to thereby latch the jaw 55 in a set position and with the trigger portion 72 disposed across the opening 70. The closure plate 47 is then returned to its closed position of Figure 6 and latched by the detent 51 and opening 52 by again pressing inwardly on the housing bottom 12 to allow said opening 52 to assume a position to receive the detent 51. Thereafter, the vertically sliding closure 20 is latched in an elevated position as previously described and as illustrated in Figures 1 and 6.

The slot 15 in the top wall 14 and the entrance opening 21 and exit opening 70 will afford sufficient light to the interior of the housing 11 so that a rodent through curiosity will enter the housing through the entrance opening 21 and proceed therethrough over the treadle 32 from right to left, as seen in Figures 6 and 7 toward the exit opening 70. After the rodent moves onto the treadle portion 38, its weight will cause the treadle 32 to swing with the shaft 35 in the bearings 36 in a counterclockwise direction, as seen in Figure 6 from its full line to its dotted line position, thereby causing the rod 41 to exert a pull on the detent 29 as the wire 24 is swung inwardly to its dotted line position of Figure 6. The detent 29 is thus retracted through the opening 30 out of engagement with the closure plate 20 allowing said plate to slide downwardly by gravity in the guides 19 to close the entrance opening 21. When this occurs, the only apparent avenue of escape available to the rodent, designated R, and shown in broken lines in Figure 6 is through the exit opening 70 as the slot 15 is too narrow to permit the rodent to escape therethrough. As the trigger portion 72 divides the exit opening 70 so that the parts disposed above and below the trigger portion 72 are of insufficient size for the rodent to escape therethrough, the rodent will attempt to push the trigger portion 72 out of the way or may attempt with its mouth to pull said portion 72 out of position across the opening 70. When this occurs, the trigger portion 72 will swing inwardly away from the opening 70 as shown in dotted lines in Fig. 6 and in so moving, the shaft portion 68 will turn in the bearing 67 causing the hook 69 to swing downwardly from its position of Figure 5 and out of engagement with the jaw retaining rod 65. When this occurs, the pressure of the spring 57 on the jaw 55 will cause the rod 65 to be swung inwardly and upwardly thereby allowing the jaw 55 to be swung forcibly downwardly by the pressure of the spring 57 from its full line position of Figures 5 and 6 toward its dotted line position. When this occurs, the intermediate portion of the jaw 55 will forcibly strike the rodent R adjacent its neck, as the rodent will be attempting to escape through the opening 70 and the spring 57 is of sufficient strength so that the striking force of the jaw 55 will ordinarily kill the rodent or impale it against the lower portion of the plate 47 so that the rodent will be killed by the spring trap of which the plate 47 forms a part. Thereafter, the opening 52 may be disengaged from the latch detent 51 as previously described and the plate 47 swung outwardly to an open position, as illustrated in Figure 6 in dotted lines, so that the rodent may be readily released from the trap, after which the trap may be reset, as previously described, for reuse. It will thus be readily apparent that a trap of extremely novel construction has been provided which is capable of functioning efficiently for catching and killing rodents without the use of a bait. Further, after the closure 20 assumes its closed position, the housing 11 is sufficiently closed so that other rodents thereafter approaching the trap will not be readily aware that a rodent has been killed therein.

Various modifications and changes are contemplated and may obviously be resorted to, without departing from the spirit or scope of the invention as hereinafter defined by the appended claims.

I claim as my invention:

1. In a rodent trap, a housing having a wall provided with an exit opening, a spring projected jaw swingably mounted on an inner side of said wall and disposed within the housing and swingable forcibly toward a part of the wall surrounding the exit opening when said jaw is released from a set position at another part of said wall, a jaw retaining member swingably mounted on said wall and releasably engaging the jaw to hold the jaw in a set position, a trigger swingably mounted on the inner side of said wall and having a first portion disposed against the inner side of said wall and across the exit opening and a second portion engaging the jaw retaining member to hold said member in engagement with the jaw, said first portion being adapted to be actuated by a rodent attempting to escape from the housing through the exit opening to move the second portion out of engagement from the jaw retaining member to release the jaw from a set position, said wall being hinged adjacent one edge thereof to a portion of the housing, and means detachably latching said wall at its opposite edge to the housing whereby said jaw, jaw retaining member and trigger are swingable outwardly of the housing with said wall for resetting the trap and for removing an entrapped rodent therefrom.

2. In a rodent trap, a housing having a wall provided with an exit opening, a spring projected jaw swingably mounted on an inner side of said wall and disposed within the housing and swingable forcibly toward a part of the wall surrounding the exit opening when said jaw is released from a set position at another part of said wall, a jaw retaining member swingably mounted on said wall and releasably engaging the jaw to hold the jaw in a set position, a trigger swingably mounted on the inner side of said wall and having a first portion disposed against the inner side of said wall and across the exit opening and a second portion engaging the jaw retaining member to hold said member in engagement with the jaw, said first portion being adapted to be actuated by a rodent attempting to escape from the housing through the exit opening to move the second portion out of engagement from the jaw retaining member to release the jaw from a set position, said wall constituting an end wall of the housing and having an upper edge hingedly connected to an end portion of a top wall of the housing, latch means detachably latching the lower edge of the end wall to an end portion of a bottom wall of the housing, said exit opening being disposed adjacent said lower edge of the end wall and said jaw being swingable downwardly toward the lower edge of the end wall when released from a set position adjacent the upper hinged edge of the end wall.

References Cited in the file of this patent

UNITED STATES PATENTS

| Number | Name | Date |
|---|---|---|
| 195,704 | Comada | Oct. 2, 1877 |
| 437,179 | Dennis | Sept. 30, 1890 |
| 844,517 | Haas | Feb. 19, 1907 |
| 1,075,669 | Regeczi | Oct. 14, 1913 |
| 1,218,406 | Jackson | Mar. 6, 1917 |
| 1,712,893 | McDougal | May 14, 1929 |
| 1,798,541 | Kleffman | Mar. 31, 1931 |
| 1,992,353 | Cattanach | Feb. 26, 1935 |
| 2,160,809 | Burnley | June 6, 1939 |
| 2,603,029 | Anderson | July 15, 1952 |